United States Patent

Bennett

[11] Patent Number: 5,881,772
[45] Date of Patent: Mar. 16, 1999

[54] SMILING DUCKBILL VALVE

[75] Inventor: Robert Alfread Bennett, Easton, Conn.

[73] Assignee: Chesebrough-Pond's USA., Co. Division of Conopco, Inc., Greenwich, Conn.

[21] Appl. No.: 3,046

[22] Filed: Jan. 5, 1998

[51] Int. Cl.⁶ ................................................. F16K 15/14
[52] U.S. Cl. .......................... 737/846; 137/844; 137/843
[58] Field of Search ..................... 137/846, 844, 137/843, 847

[56] References Cited

U.S. PATENT DOCUMENTS

| | | | |
|---|---|---|---|
| 657,007 | 8/1900 | Richter | 137/846 |
| 3,349,972 | 10/1967 | Whiteford . | |
| 3,369,496 | 2/1968 | Bushmeyer | 137/846 |
| 3,517,682 | 6/1970 | Smith | 137/846 |
| 3,730,217 | 5/1973 | Gute | 137/846 |
| 4,524,805 | 6/1985 | Hoffman | 137/846 |
| 4,660,747 | 4/1987 | Borg et al. . | |
| 4,870,992 | 10/1989 | Irwin et al. | 137/846 |
| 5,010,925 | 4/1991 | Atkinson et al. . | |
| 5,234,138 | 8/1993 | De Laforcade . | |

FOREIGN PATENT DOCUMENTS

| | | | |
|---|---|---|---|
| 362324 | 7/1920 | Germany | 137/846 |
| 2153048 | 8/1985 | United Kingdom | 137/846 |

OTHER PUBLICATIONS

Vernay Product Brochure—May 1979.

*Primary Examiner*—Denise L. Ferensic
*Assistant Examiner*—Joanne Y. Kim
*Attorney, Agent, or Firm*—Milton L. Honing

[57] ABSTRACT

A duckbill valve is provided based on a valve seal with a hollow cylindrical body with first and second ends, the first end having an open mouth, the second end having a closable mouth circumscribed by a pair of crescent shaped lips. One of the lips has a thinner width than the other. The cylindrical body flares outward in the direction from the first end towards the second end. In another aspect, the cylindrical body includes a posterior and an anterior section adjacent the respective first and second ends, the anterior section having an outer wall portion curvilinearly tapering toward the thinner lip. Valves of the present invention are particularly suitable for controlling flow of semi-solid substances because the mouth of the duckbill can open to a relatively large extent, the latter being off-center within a round collar fitting.

8 Claims, 1 Drawing Sheet

SMILING DUCKBILL VALVE

BACKGROUND OF THE INVENTION

1. Field of the Invention

The invention concerns a new duckbill valve for use primarily in controlling flow of fluid substances.

2. The Related Art

Duckbill valves are utilized to regulate pressure in a host of devices spanning many industries. Applications for these devices are found in automotive brakes, small home appliances, kidney dialysis, hypodermic syringes, sporting goods, toys, non-aerosol pumps and a variety of industrial equipment. Their popularity stems from their simple construction. No moving parts are present other than the rubber housing itself.

Commonly these valves in a closed position exhibit a mouth with lips defined by a straight slit. Internal pressure opens these lips to form a flat ovaloid shape. The opening is sufficient for relief of gas pressure. However, the relatively small mouth opening is insufficiently large for allowing meaningful flow of semi-solid or even liquid media. A duckbill valve with capability to transfer relatively viscous media would be highly desirable, especially in view of the relatively inexpensive manufacturing costs associated with this type of control device.

Accordingly, it is an object of the present invention to provide a duckbill valve and seal component which in an open position has a relatively large passageway for transfer of semi-solid media.

Another object of the present invention is to provide a duckbill valve and seal component which can dispense semi-solid substances in an even manner without suckback problems.

SUMMARY OF THE INVENTION

A duckbill valve is provided based on a valve seal which includes a hollow cylindrical body with first and second ends, the first end having an open mouth, the second end having a closable mouth circumscribed by a pair of crescent shaped lips. The lips are on an outer surface of the body, one of the lips having a thinner width than the other along a middle area of the lips.

The cylindrical body flares outward in a direction from first toward second end. The cylindrical body includes a posterior section adjacent the second end and an anterior section adjacent the first end. The anterior section has an outer wall portion curvilinearly tapering downward toward the thinner width lip. Additionally the anterior section has another outer wall portion dorsal to the curvilinearly tapering outer wall portion. This dorsal positioned outer wall forms a periphery of the lip.

The curvilinearly tapering outer wall is further characterized by variation in cross sectional thickness. Particularly, the cross sectional thickness decreases in a direction from the posterior section down toward the thinner lip. A flange surrounds the open mouth of the first end. The flange has a greater outer diameter than that of the cylindrical body.

The cylindrical body is formed of an elastomeric resin which may be a silicone or a hydrocarbon homo- or copolymer. Hydrocarbon polymers may be formed from monomers selected from the group consisting of styrene, isobutene, isoprene, butadiene, divinyl benzene, ethylene, propylene, acrylonitrile and mixtures thereof. Commercially available elastomeric resins include Kraton®, Santoprene® and Buna rubber. Plasticizers may be incorporated into the resin to achieve appropriate properties. Manufacture of the cylindrical body is preferably through injection molding. The process involves injecting an elastomer in fluid state into a mold. The mold should contain surface structures that allow formation of an open slit within the elastomeric body. Subsequent to injection, the molded body is ejected from the mold of the machine.

A particularly unusual aspect of duckbill valve seals according to the present invention is that the closable mouth at the second end of the cylindrical body has lips separated into a smile shaped orientation. Closure of the seal valve occurs when the cylindrical body is inserted into a round fitting. Interior walls of the fitting press against the outer walls of the elastomeric cylindrical body causing the lips to compress together in a broadened, sealed smile.

Operation of the valve is in the following manner. Hand pressure is applied against flexible walls of the container carrying a semi-solid flowable material. Pressure of the product flow forces apart the lips of the duckbill valve which sits astride an opening of the container. The thin walled lip is particularly responsive to product flow; it provides the main expansion means of the closable mouth. Once pressure is removed, the thicker cross-sectional portion of the curvilinearly tapering outer wall imparts enough resilient memory to allow return of the thinner lip to its closed position.

DETAILED DESCRIPTION OF THE DRAWINGS

The various aspects, features and advantages of the present invention will more fully be explained by reference to the following drawing in which.

DETAILED DESCRIPTION OF THE INVENTION

Figure 1:
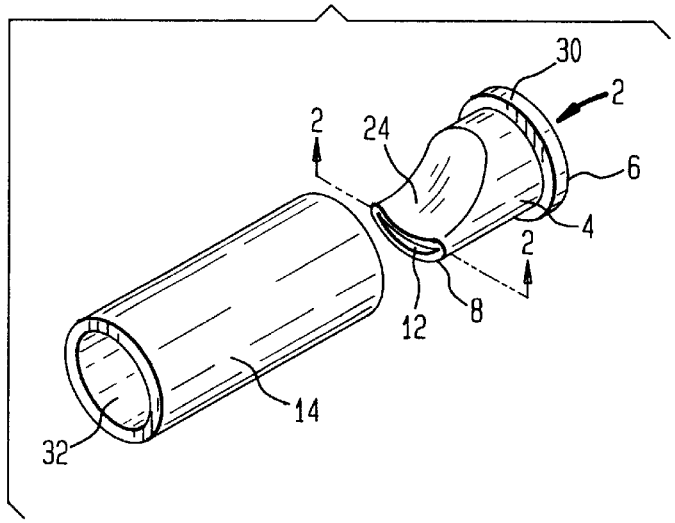
FIG. 1 is a perspective view of the duckbill valve seal prior to insertion into a round fitting.

FIG. 1 illustrates the duckbill valve seal 2 of the present invention prior to insertion into a round fitting 14. The valve seal includes a hollow cylindrical body 4 with first and second ends 6 and 8. The first end 6 has an open mouth 10. The second end 8 has a closable mouth 12 circumscribed by a pair of crescent shaped lips. These lips are joined along an outer surface of the cylindrical body, the upper one of the lips 16 having a thinner width than the lower other lip 18 along a middle area.

Figure 2:
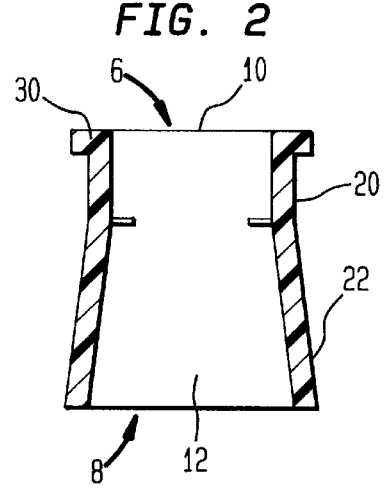
FIG. 2 is a cross sectional view of the duckbill valve seal taken along line 2—2 of FIG. 1.
Figure 3:
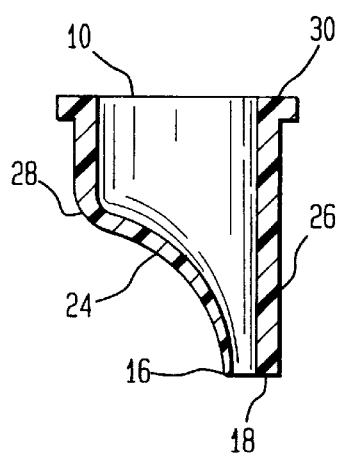
FIG. 3 is a cross sectional view of the duckbill valve seal taken along line 3—3 of FIG. 4.
Figure 4:
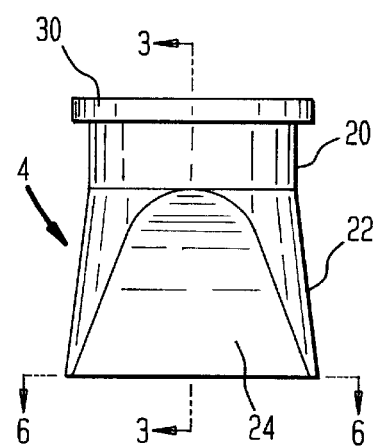
FIG. 4 is a top elevational view of the duckbill valve seal.
Figure 5:
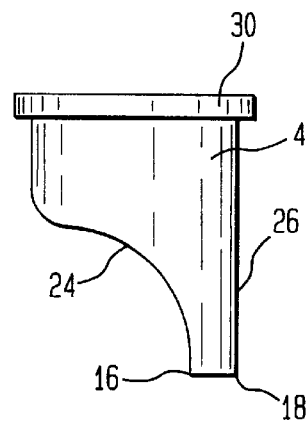
FIG. 5 is a side elevational view of the duckbill valve seal.

FIG. 2 illustrates the cylindrical body 4 flaring outwardly in a direction from the first end toward the second end. FIGS. 3 and 5 show the cylindrical body 4 including a posterior section 20 adjacent the first end and an anterior section 22 adjacent the second end. An outer wall portion 24 of the anterior section curvilinearly tapers downward toward the thinner lip 16. Another outer wall portion 26 of the anterior section is dorsal to the curvilinearly tapering outer wall portion 24. This dorsal outer wall portion forms a periphery of the lower lip 18.

As best shown in FIG. 3, the curvilinearly tapering outer wall portion 24 has a varying cross sectional thickness. More particularly, the cross sectional thickness 28 decreases in a direction from the posterior section down toward the thinner lip.

A flange 30 surrounds the open mouth of the first end of the cylindrical body. The flange has a greater outer diameter than an outer diameter of the cylindrical body.

Figure 8:
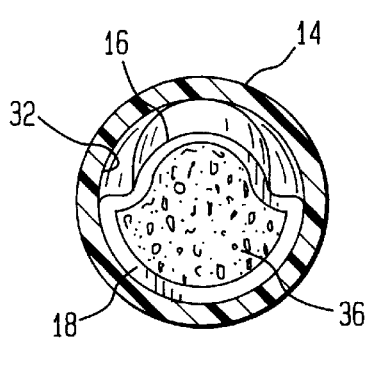
FIG. 8 is a front elevational view similar to FIG. 7 except the valve is now shown in an open position.
Figure 7:
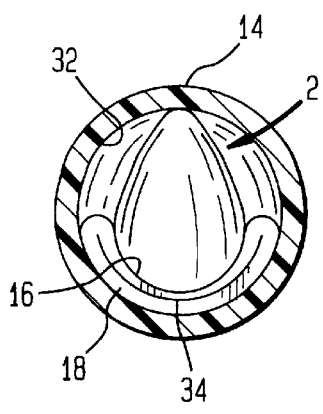
FIG. 7 is a front elevational view of the duckbill valve seal shown in FIG. 6 now inserted into a fitting and illustrating the closed position.
Figure 6:
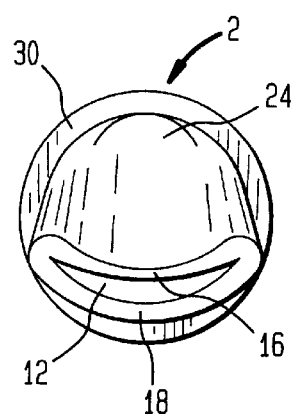
FIG. 6 is a front elevational view of the duckbill valve seal prior to insertion into the fitting.

FIG. 7 illustrates the duckbill valve seal 2 of FIG. 6 being compressed within the round interior walls 32 of tubular fitting 14. Compression of the lips results in a tight seal 34 representing a closed position of the valve. FIG. 8 illustrates a semi-solid media 36 flowing through and opening the seal 34 allowing the upper thin lip 16 to distend in an inward direction within the fitting.

Although only a single embodiment has been described, those skilled in the art will be able to supply further modifications and adaptations all of which are considered within the purview and scope of the present invention.

What is claimed is:

1. A valve seal comprising a hollow cylindrical body with first and second ends, the first end having an open mouth, the second end having a closable mouth circumscribed by a pair of crescent shaped lips, one of the lips at a terminus of the second end along a middle area being thinner than along adjacent terminal areas of that lip, the other lip having a uniform thickness at a terminus of the second end, and both lips in a closed position lying completely to one side of a plane bisecting the first end of the hollow cylindrical body.

2. The valve seal according to claim 1 wherein the lips are joined along an outer surface of the cylindrical body, one of the lips having a thinner width than the other along a middle area.

3. The valve seal according to claim 1 wherein the cylindrical body flares outward in a direction from the first end toward the second end.

4. The valve seal according to claim 2 wherein the cylindrical body includes a posterior section adjacent the first end and an anterior section adjacent the second end, the anterior section having an outer wall portion curvilinearly tapering toward the thinner lip.

5. The valve seal according to claim 4 wherein the anterior section has another outer wall portion dorsal to the curvilinearly tapering outer wall portion, the another outer wall portion forming a periphery of the other lip.

6. The valve seal according to claim 4 wherein the curvilinearly tapering outer wall portion has a varying cross sectional thickness.

7. The valve seal according to claim 6 wherein the cross sectional thickness decreases in a direction from the posterior section down toward the thinner lip.

8. The valve seal according to claim 1 wherein the open mouth of the first end is surrounded by a flange of greater outer diameter than an outer diameter of the cylindrical body.

* * * * *